US007963088B2

(12) United States Patent
Simpson, Jr. et al.

(10) Patent No.: US 7,963,088 B2
(45) Date of Patent: Jun. 21, 2011

(54) PLASTIC CONTAINER BASE STRUCTURE AND METHOD FOR HOT FILLING A PLASTIC CONTAINER

(75) Inventors: Charles P. Simpson, Jr., York, PA (US); Todd Budden, Broomfield, CO (US); John P. Dinkel, York, PA (US)

(73) Assignee: Graham Packaging Company, L.P., York, PA (US)

( * ) Notice: Subject to any disclaimer, the term of this patent is extended or adjusted under 35 U.S.C. 154(b) by 0 days.

(21) Appl. No.: 12/472,301

(22) Filed: May 26, 2009

(65) Prior Publication Data

US 2009/0229704 A1 Sep. 17, 2009

Related U.S. Application Data

(62) Division of application No. 11/431,503, filed on May 11, 2006, now Pat. No. 7,780,025.

(51) Int. Cl.
*B65B 55/14* (2006.01)
*B65B 63/08* (2006.01)
*A23B 5/005* (2006.01)

(52) U.S. Cl. ................ 53/440; 53/431; 53/471; 53/127; 53/284.5; 426/399; 426/524

(58) Field of Classification Search .................... 53/428, 53/431, 432, 440, 471, 111 R, 510, 127, 111 RC, 53/281, 284.5; 426/665, 399, 404, 408, 524
See application file for complete search history.

(56) References Cited

U.S. PATENT DOCUMENTS

| | | | | |
|---|---|---|---|---|
| 1,030,637 A | | 6/1912 | Beadle | |
| 3,409,167 A | | 11/1968 | Blanchard | |
| 3,466,443 A | | 9/1969 | Roesler et al. | |
| 3,973,693 A | | 8/1976 | Brocklehurst | |
| 4,054,219 A | | 10/1977 | Young et al. | |
| D253,037 S | | 10/1979 | Barouh | |
| 4,254,882 A | | 3/1981 | Yoshino | |
| 4,598,831 A | | 7/1986 | Nakamura et al. | |
| 4,662,154 A | * | 5/1987 | Hayward | 53/431 |
| 4,696,580 A | * | 9/1987 | Kameda | 374/162 |
| 4,703,609 A | * | 11/1987 | Yoshida et al. | 53/431 |
| 4,894,268 A | | 1/1990 | Greenwood et al. | |
| 4,993,566 A | | 2/1991 | Eberle | |
| 4,993,567 A | | 2/1991 | Eberle, Jr. | |
| 5,033,254 A | * | 7/1991 | Zenger | 53/431 |

(Continued)

FOREIGN PATENT DOCUMENTS

FR 2796919 2/2001

*Primary Examiner* — Paul R Durand

(74) *Attorney, Agent, or Firm* — Knoble Yoshida & Dunleavy, LLC

(57) ABSTRACT

A base for a plastic container defining a central longitudinal axis. The base includes an annular standing ring portion defining a standing surface. The base includes a substantially cylindrical ring portion extending in a direction substantially perpendicular to the standing surface. The base further includes a substantially concave dome portion extending inwardly from the substantially cylindrical ring portion to the longitudinal axis. The concave dome portion of the base includes a first plurality of substantially triangular panels circumferentially spaced around the longitudinal axis, and a second plurality of substantially triangular panels circumferentially spaced around the longitudinal axis. At least a portion of each of the second plurality of substantially triangular panels is circumferentially and longitudinally offset from the first plurality of substantially triangular panels. A container preform and method of hot filling a plastic container are also disclosed.

3 Claims, 9 Drawing Sheets

U.S. PATENT DOCUMENTS

| | | | | |
|---|---|---|---|---|
| 5,251,424 | A * | 10/1993 | Zenger et al. | 53/431 |
| 5,503,283 | A | 4/1996 | Semersky | |
| 5,804,237 | A * | 9/1998 | Diamond et al. | 426/131 |
| 6,065,624 | A | 5/2000 | Steinke | |
| 6,105,341 | A * | 8/2000 | Campbell | 53/432 |
| 6,182,715 | B1 | 2/2001 | Ziegler et al. | |
| D448,300 | S | 9/2001 | Walters et al. | |
| D467,183 | S | 12/2002 | Chew | |
| 6,519,919 | B1 * | 2/2003 | Takenouchi et al. | 53/431 |
| D476,896 | S | 7/2003 | Cheng et al. | |
| 6,585,123 | B1 | 7/2003 | Pedmo et al. | |
| D478,511 | S | 8/2003 | Reynolds | |
| 6,637,612 | B2 | 10/2003 | Maczek | |
| 6,688,081 | B2 * | 2/2004 | Boyd | 53/440 |
| D501,792 | S | 2/2005 | Priestman | |
| 6,912,825 | B2 * | 7/2005 | Kothari | 53/133.2 |
| D517,918 | S | 3/2006 | Colloud et al. | |
| D534,079 | S | 12/2006 | Livingston | |
| 2002/0063105 | A1 | 5/2002 | Darr et al. | |
| 2004/0000533 | A1 | 1/2004 | Kamineni et al. | |
| 2004/0084333 | A1 * | 5/2004 | Boyd | 206/204 |
| 2004/0195199 | A1 | 10/2004 | Maki et al. | |
| 2005/0011580 | A1 | 1/2005 | Ziegler | |
| 2005/0139572 | A1 | 6/2005 | Pedmo et al. | |
| 2007/0000858 | A1 | 1/2007 | Boukobza | |
| 2008/0187632 | A1 * | 8/2008 | Smith et al. | 426/112 |

* cited by examiner

PLASTIC CONTAINER BASE STRUCTURE AND METHOD FOR HOT FILLING A PLASTIC CONTAINER

CROSS REFERENCE TO RELATED APPLICATIONS

This is a divisional of application Ser. No. 11/431,503 now U.S. Pat. No. 7,780,025, filed May 11, 2006, the entire disclosure of which is hereby incorporated by reference as if set forth fully herein.

This Application claims the priority of U.S. Design application Ser. No. 29/242,551, filed Nov. 14, 2005, the entire contents of which are incorporated herein by reference.

BACKGROUND OF THE INVENTION

1. Field of the Invention

The present invention relates generally to a plastic container, and more particularly to a plastic container having a base structure that enhances the structural integrity of the container. The present invention also relates to a preform for forming a plastic container having a base structure that enhances the structural integrity of the container and a method for hot filling a plastic container with a product.

2. Related Art

Plastic containers are commonly used to package a wide variety of liquid, viscous or solid products including, for example, juices, other beverages, yoghurt, sauces, pudding, lotions, soaps in liquid or gel form, and candy. Such containers can be made by conventional blow molding processes including, for example, extrusion blow molding, stretch blow molding, and injection blow molding. A plastic container can generally be filled with any contents intended to be contained therein and can then be sealed or capped to form a sealed enclosure.

Many conventional containers are configured and formed to withstand the rigors of so-called hot fill processing. In a hot fill process, a liquid product is added to the container at an elevated temperature which can be near the glass transition temperature of the plastic material, and the container is then capped. As the container and its contents cool, the contents tend to contract and this volumetric change creates a partial vacuum within the container. In the absence of some means for accommodating these internal volumetric and barometric changes, containers tend to deform and/or collapse. For example, a round container can undergo ovalization, or tend to distort and become out of round. Containers of other shapes can become similarly distorted. In addition to these changes that adversely affect the appearance of the container, distortion or deformation can create weak portions in the container walls. Such deformation can also cause the container to become unstable, particularly when distortion of the base region occurs.

One well known arrangement for overcoming or withstanding these tendencies includes simply adding more material to the outside structural walls of the container. This solution, however, can be costly, not only in terms of the additional material required for each container, but also in terms of shipping and handling of mass quantities of heavy containers. End consumers are also generally more amenable to lighter-weight containers in terms of ease of use and waste product reduction. Thus, lightweight plastic containers that still meet particular strength requirements are more desirable to both product manufacturers and consumers alike.

Another known solution is the introduction of hinged vacuum panels on a portion of the container. Hinged panels are generally employed in hot filled plastic containers to effectively absorb volumetric changes created by the partial vacuum within the container upon cooling. Although this arrangement allows lightweight plastic containers to overcome the volumetric changes resulting from hot fill processing while still maintaining overall strength and shape, the hinged vacuum panels may not provide a desired aesthetic appearance such as, for example, the look of a smooth glass bottle.

More recently, in order to avoid the need for providing the hinged vacuum panels in a portion of a hot filled container, it has been proposed to offset the vacuum effects associated with hot filling by introducing a liquefied gas such as, for example, liquid nitrogen, into the container prior to capping. Specifically, once the container is hot filled with the contents, a liquefied gas injection system introduces a predetermined amount of the liquefied gas into the hot filled container and the container is then sealed and/or capped. Thereafter, the liquefied gas undergoes a phase change from liquid form to gas form, thereby increasing the positive internal pressure of the container. The positive internal pressure created within the container is a function of the inherent properties of the particular liquefied gas utilized as well as the amount injected, the temperature of the hot filled material, and the time between injection of the liquefied gas and the capping of the container. Some known methods and systems for liquid gas injection are described, for example, in U.S. Pat. No. 5,251,424 to Zenger et al., U.S. Pat. No. 6,182,715 B1 to Ziegler et al., and U.S. Patent Application Publication No. 2005/0011580 A1 to Ziegler et al., all of which are hereby incorporated by reference in their entirety.

One particular problem that arises in lightweight containers that are hot filled and injected with liquefied gas, however, is eversion, or so-called "rollout." For example, when the liquefied gas is injected into the container and the container is then capped, the positive internal pressure created by the phase change of the liquified gas can tend to cause at least some portion of the container to evert, or bulge, outwardly (i.e., "rollout"). This not only presents a problem in terms of overall aesthetic appearance of the container, but also in terms of the practical and functional aspects of the container, such as when such rollout occurs in the base of the container. In this respect, the container may no longer be able to stand upright, thus ultimately affecting stacking, shipping, and overall consumer end use of the container.

What is needed, therefore, is an improved plastic container base structure that provides the necessary structural integrity to prevent eversion or rollout of the base portion when a positive internal pressure arises within the container.

BRIEF SUMMARY OF THE INVENTION

A base for a hot-filled, pressurized container and a plastic container having such a base are disclosed.

Exemplary embodiments of the present invention provide a base for a plastic container defining a central longitudinal axis. In one embodiment, the base includes an annular standing ring portion defining a standing surface. The base includes a substantially cylindrical ring portion extending in a direction substantially perpendicular to the standing surface. The base further includes a substantially concave dome portion extending inwardly from the substantially cylindrical ring portion to the longitudinal axis. The concave dome portion of the base includes a first plurality of substantially triangular panels circumferentially spaced around the longitudinal axis, and a second plurality of substantially triangular panels circumferentially spaced around the longitudinal axis.

At least a portion of each of the second plurality of substantially triangular panels is circumferentially and longitudinally offset from the first plurality of substantially triangular panels.

Each of the first plurality of substantially triangular panels has a first substantially planar section extending substantially radially outwardly from the longitudinal axis at a first predetermined angle with respect to the standing surface defined by the annular standing ring portion. Each of the first plurality of substantially triangular panels also has a second substantially planar section extending outwardly from an outer periphery of the first substantially planar section at a second predetermined angle with respect to the standing surface defined by the annular standing ring portion. The first and second predetermined angles may not be the same, and the second predetermined angle can be greater than the first predetermined angle. An outer periphery of the second section is connected to the substantially cylindrical ring portion. Each of the second plurality of substantially triangular panels extend concavely outwardly from the longitudinal axis to the substantially cylindrical ring portion. In appearance, the first plurality of substantially triangular panels form a first maltese cross pattern in the concave dome portion of the base portion of the container, and the second plurality of substantially triangular panels form a second maltese cross pattern in the concave dome portion of the base portion of the container. The first maltese cross pattern and the second maltese cross pattern are circumferentially offset from one another by about 45 degrees.

The concave dome portion of the base further includes a third plurality of substantially triangular panels. Each of the third plurality of substantially triangular panels are circumferentially spaced from one another and defines a plane extending substantially parallel to the longitudinal axis. Further, each of the third plurality of substantially triangular panels are disposed between one of the first plurality of substantially triangular panels and an adjacent one of the second plurality of substantially triangular panels.

In another exemplary embodiment of the present invention, a plastic container defining a longitudinal axis is provided. The plastic container includes a body portion having a first end connected to a finish defining an opening, and a second end connected to a base portion as previously set forth above.

The present invention also provides a preform for forming a plastic container. The preform includes a body portion extending longitudinally between a closed end portion and an open end portion. The body portion includes a middle section having a predetermined material thickness and a tapered section longitudinally extending between the middle section and the open end portion and having a substantially decreasing material thickness between the middle section and the open end portion. At least a portion of the closed end portion of the preform has a material thickness that is less than the predetermined material thickness of the middle section.

The present invention further provides a method of hot filling a plastic container. The method includes the steps of filling the plastic container with a product having a maximum temperature of approximately 184 degrees F. to a predetermined fill point, injecting a liquid cryogen material into the filled plastic container, sealing the plastic container with a closure to create a positive internal pressure, and placing the plastic container and the product in a cooling apparatus in less than approximately 90 seconds to cool the container and the product to a predetermined temperature.

Further advantages, as well as the structure and function of the exemplary embodiments, will become apparent from a consideration of the following description, drawings, and examples.

BRIEF DESCRIPTION OF THE DRAWINGS

The foregoing and other features and advantages of the invention will be apparent from the following, more particular description of an exemplary embodiment of the invention, as illustrated in the accompanying drawings wherein like reference numbers generally indicate identical, functionally similar, and/or structurally similar elements.

DETAILED DESCRIPTION OF THE INVENTION

Exemplary embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without departing from the spirit and scope of the invention. All references cited herein are incorporated by reference as if each had been individually incorporated.

Figure 1:
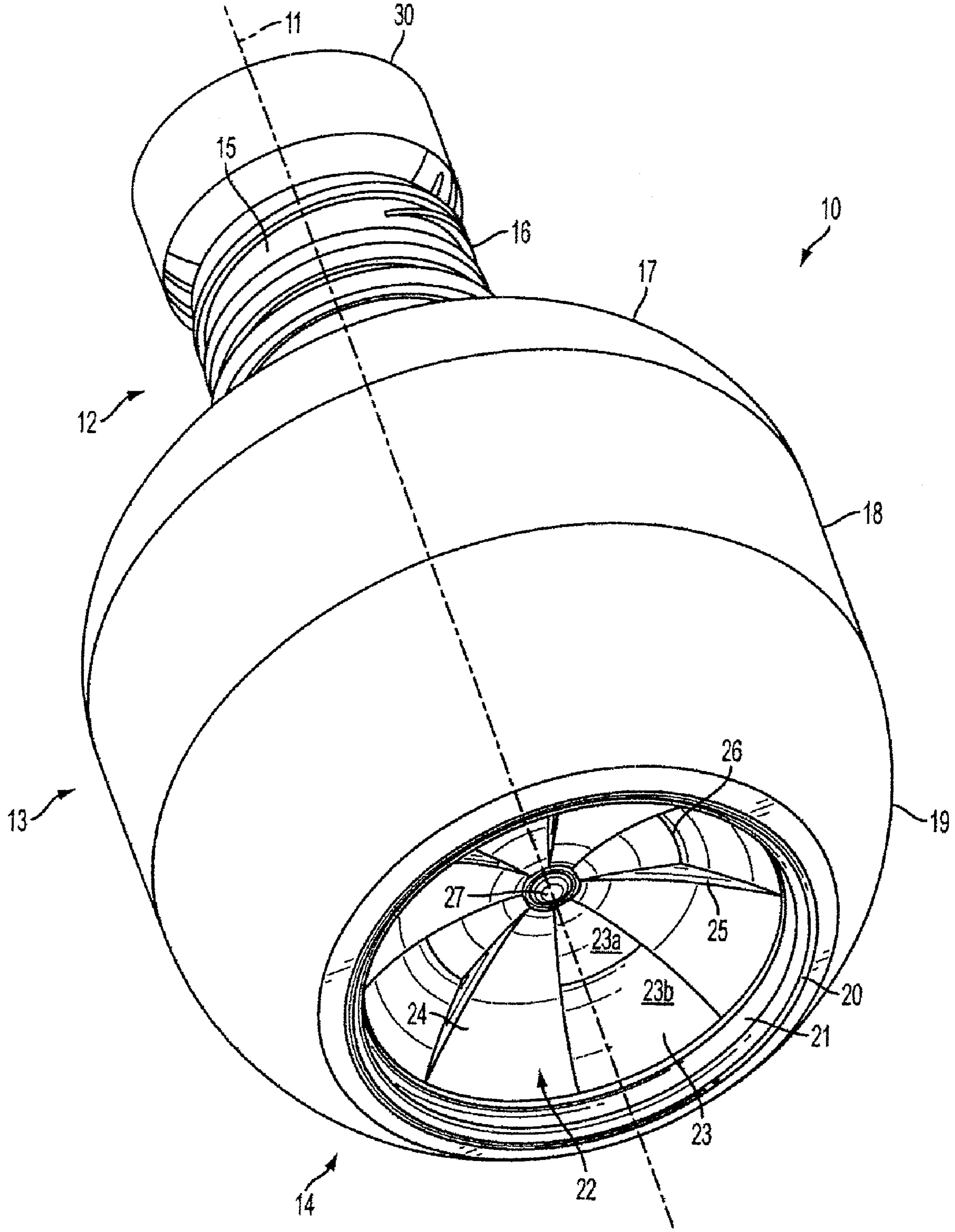
FIG. 1 is a perspective view of a plastic container according to an exemplary embodiment of the present invention.
Figure 2:
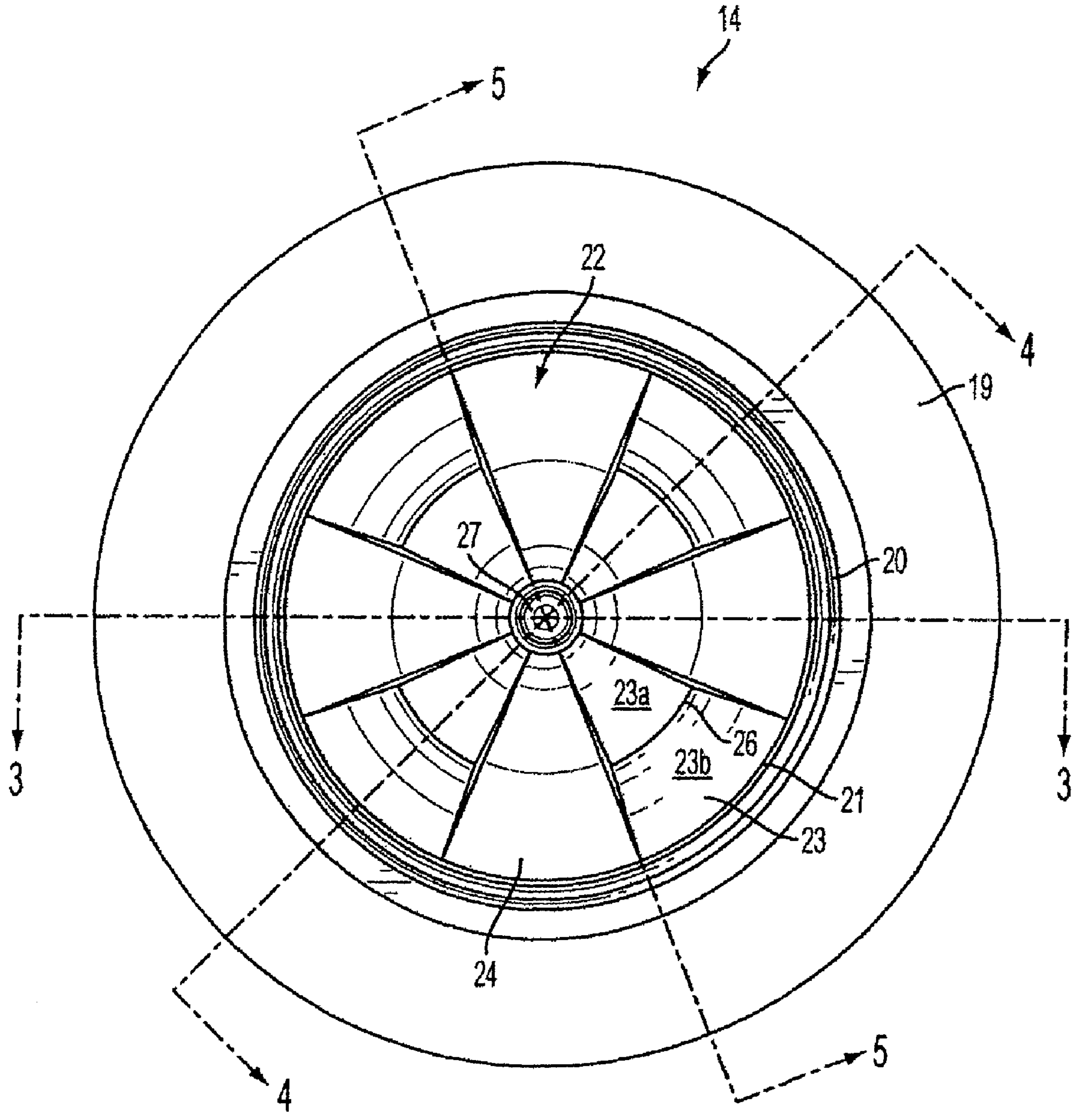
FIG. 2 is a bottom view of the base portion of the plastic container of FIG. 1.

FIGS. 1 and 2 are perspective and bottom views, respectively, of a plastic container 10 according to an exemplary embodiment of the present invention. The container 10 is generally symmetrical around a longitudinal axis 11 and includes a neck portion 12, a body portion 13, and a base portion 14, together forming a substantially enclosed space. The container 10 can be used to package a wide variety of liquid, viscous or solid products including, for example, juices, other beverages, yoghurt, sauces, pudding, lotions, soaps in liquid or gel form, nuts, and/or candy. Neck portion 12 includes a finish 15 defining an opening. The finish 15 may include an engageable closure feature such as, for example, threads 16. The finish 15 and the threads 16 are configured to be engaged by a cap 30 to seal the container 10. Alternatively, any other known closure feature may be used, such as an annular snap fit connection ring (not shown). A first end of the body portion 13 is connected to an end of the neck portion 12 opposite the opening and includes a first transition portion 17, a sidewall portion 18, and a second transition portion 19 at a second end of the body portion 13. The sidewall portion 18 of the body portion 13, as shown, can be substantially tubular or spherical, but can have any cross sectional shape. Cross sectional shapes include, for example, a circular transverse cross section, as illustrated; an oval transverse cross section; a substantially square transverse cross section; other substantially polygonal transverse cross sectional shapes such as triangular, pentagonal, etc.; or combinations of curved and arced shapes with linear portions. As will be understood, when the container 10 has a substantially polygonal transverse cross sectional shape, the corners of the polygon are typically rounded or chamfered.

Figure 3:
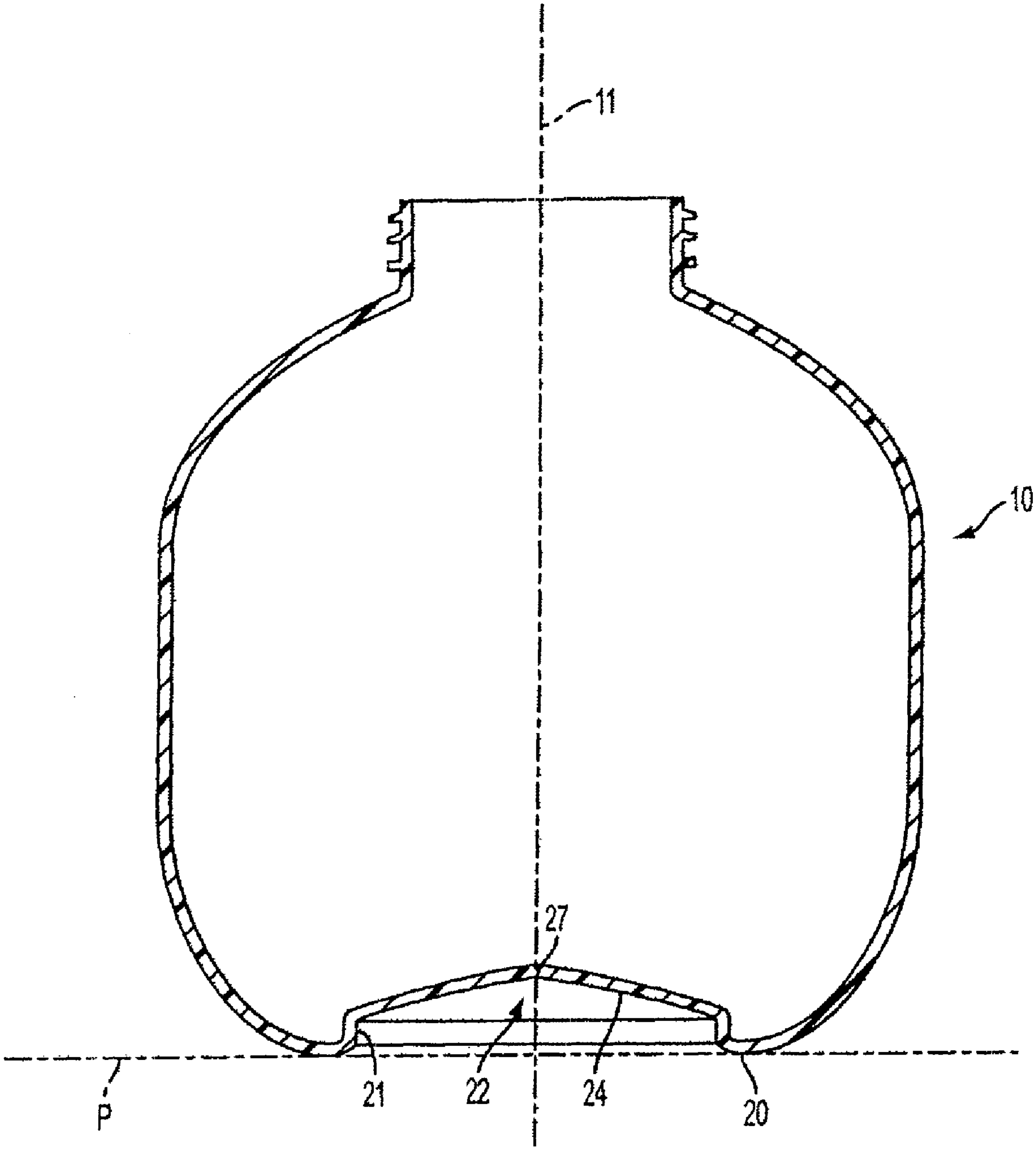
FIG. 3 depicts a first cross-sectional view of the plastic container of FIG. 1, taken along lines 3-3 of FIG. 2.
Figure 4:
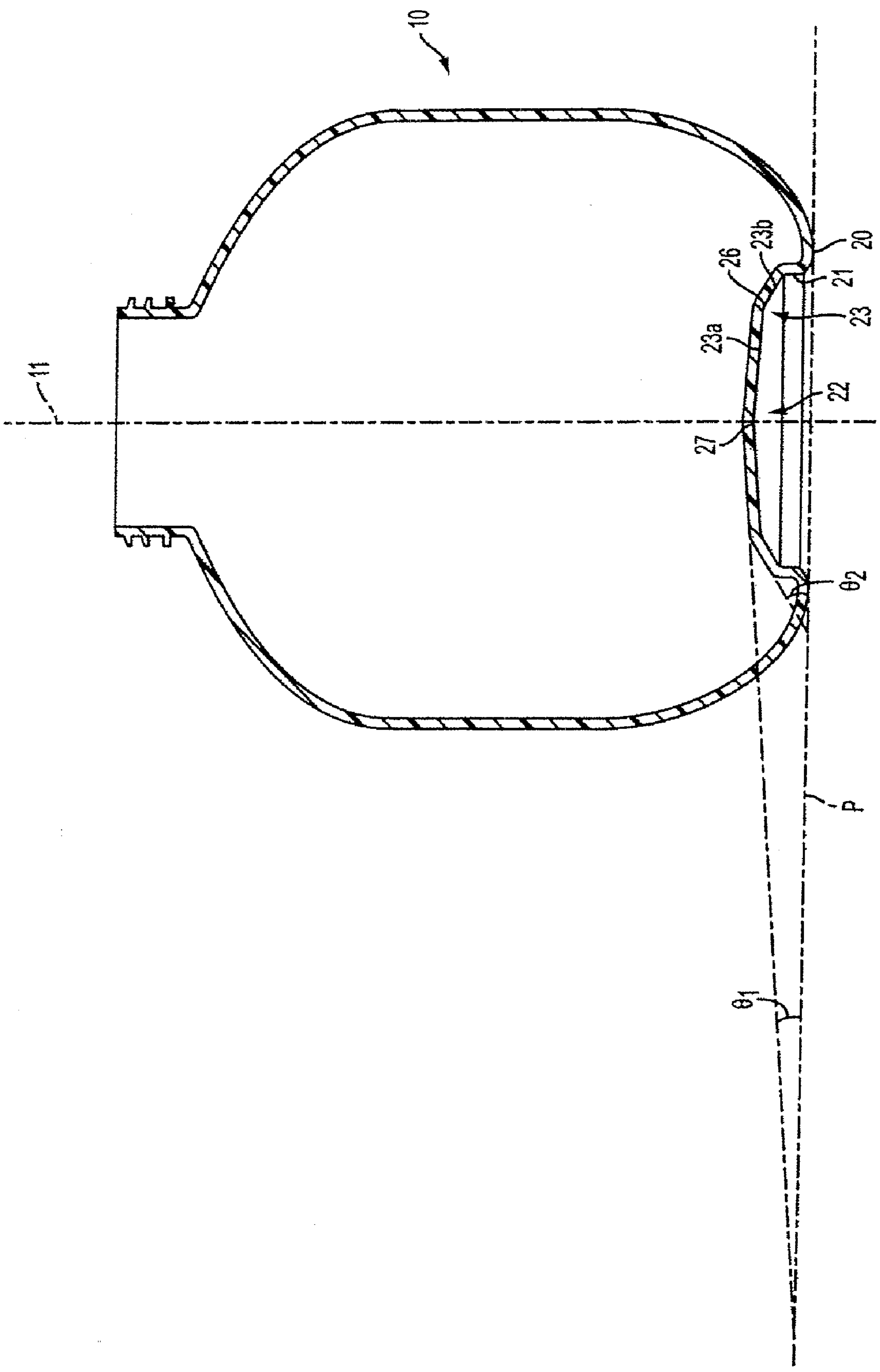
FIG. 4 depicts a second cross-sectional view of the plastic container of FIG. 1, taken along lines 4-4 of FIG. 2.
Figure 5:
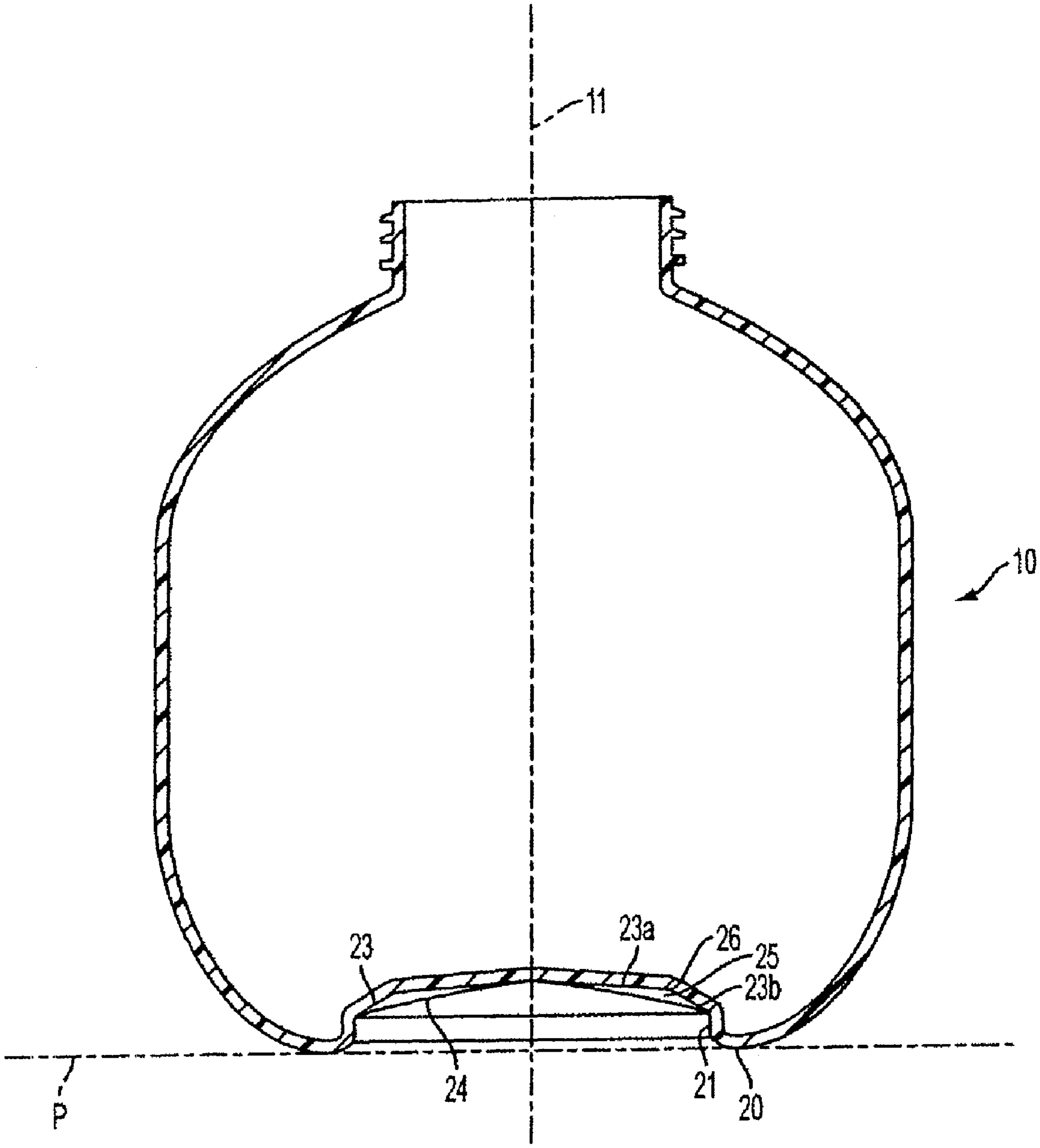
FIG. 5 depicts a third cross-sectional view of the plastic container of FIG. 1, taken along lines 5-5 of FIG. 2.

The container 10 can be configured to withstand positive internal pressures as high as 30-60 PSI when the container 10 is hot filled at a maximum temperature of approximately 182° F., for example, and then injected with liquefied gas, such as, for example, liquid nitrogen, and capped. In an exemplary embodiment, the container 10 is hot filled at a temperature between 178° F. and 180° F. In order to withstand such pressures and prevent eversion or "rollout" of the base portion 14, the base portion 14 of the container 10 can include a combination of features shown in FIGS. 1 and 2, such as, for example, an annular standing ring portion 20, a substantially cylindrical reinforcing ring portion 21, and a substantially concave dome portion 22 having a plurality of circumferentially distributed strengthening panels. The annular standing ring portion 20 can be connected to the second transition portion 19. As shown in FIGS. 3-5, for example, the annular standing ring portion 20 can define a standing surface lying in a plane P substantially perpendicular to, or at some other angle relative to, the longitudinal axis 11 to allow the container 10 to stand upright when placed on a flat surface during stacking or during use by an end consumer. The substantially cylindrical ring portion 21 can be connected to the annular standing ring 21 and can extend therefrom towards the neck portion 12 in a direction substantially perpendicular to the standing surface defined by the annular standing ring portion 20. The substantially cylindrical ring portion 21 can be parallel to the longitudinal axis 11, but may also extend at some other angle relative to the longitudinal axis 11.

The dome portion 22 extends inwardly from an end of the substantially cylindrical ring portion 21 to a convergence point 27 disposed along the longitudinal axis 11. The dome portion 22 is substantially concave when viewed from outside the container 10 and, at the same time, substantially convex when viewed from inside the container 10 through the opening defined by finish 15. The substantially concave dome portion 22 can include a first plurality of substantially triangular panels 23 circumferentially spaced around the longitudinal axis 11 and a second plurality of substantially triangular panels 24 circumferentially spaced around the longitudinal axis 11. At least a portion of each of the second plurality of substantially triangular panels 24 can be circumferentially and longitudinally offset from the first plurality of substantially triangular panels 23. Although the first and second pluralities of substantially triangular panels 23, 24, as described thus far and depicted in FIGS. 1-5, each include four circumferentially offset substantially triangular panels 23, 24, one of ordinary skill will recognize that more or fewer panels could be included based on particular design and functional considerations. The first and second pluralities of substantially triangular panels 23, 24 may have the same or different thicknesses with respect to one another on desired strength characteristics and preform design characteristics. Each of the first and second pluralities of substantially triangular panels 23, 24 can have a radially uniform thickness or, alternatively, can have a radially varying thickness depending on desired strength characteristics and preform design characteristics.

The first plurality of substantially triangular panels 23 can include a first substantially planar section 23*a* extending substantially radially outwardly, from the convergence point 27, at a first predetermined angle $\theta_1$ with respect to the standing surface plane P (see FIG. 4). The first plurality of substantially triangular panels 23 can further include a second substantially planar section 23*b* extending radially outwardly, from an outer periphery 26 of the first substantially planar section 23*a*, at a second predetermined angle $\theta_2$ with respect to the standing surface plane P (see FIG. 4). In the exemplary embodiment of the container 10 shown in FIGS. 4 & 5, the first and second predetermined angles $\theta_1$, $\theta_2$ are different from one another, specifically, the second predetermined angle $\theta_2$ is greater than the first predetermined angle $\theta_1$ (i.e., the first section 23*a* has a smaller slope than the second section 23*b* relative to the standing surface plane P). However, in alternative embodiments, the first and second predetermined angles $\theta_1$, $\theta_2$ may be the same. An outer periphery of the second section 23*b* can be connected to the substantially cylindrical ring portion 21.

FIG. 3 depicts a first cross-sectional view of the plastic container of FIG. 1, taken along lines 3-3 of FIG. 2. FIG. 3 shows the substantially concave profile of the second plurality of substantially triangular panels 24. Due to the respective configurations of the first and second pluralities of substantially triangular panels 23, 24, the concave dome portion 22 can further include a third plurality of substantially triangular panels 25 (FIGS. 1 & 5). Each of the third plurality of substantially triangular panels 25 can be circumferentially disposed between each panel of the first plurality of substantially triangular panels 23 and an adjacent panel of the second plurality of substantially triangular panels 24 (FIG. 5). Consequently, each of the third plurality of substantially triangular panels 25 are circumferentially spaced from one another to define a plurality of planes extending radially outward from, and substantially parallel to, the longitudinal axis 11.

As shown in FIG. 2, for example, the first plurality of substantially triangular panels 23 can form a first maltese cross pattern in the concave dome portion 22 of the base portion 14 of the container 10, and the second plurality of substantially triangular panels 24 can form a second maltese cross pattern in the concave dome portion 22 of the base portion 14 of the container 10. The first maltese cross pattern and the second maltese cross pattern can be circumferentially offset from one another by about 45 degrees. Furthermore, with reference again to FIG. 1 and FIG. 5, at least a portion of each of the first maltese cross pattern and the second maltese cross pattern can be longitudinally offset with respect to one another.

In the foregoing exemplary embodiment, it is believed that the combination of at least the substantially cylindrical ring portion 21, and the concave domed portion 22 having the first and second pluralities of circumferentially spaced substantially triangular panels 23, 24 provides the desired structural integrity to the base portion 14 of the container 10. The foregoing features can provide the necessary strength to withstand the changes in temperature, pressure, and volume within the container 10 during hot filling, injection of the liquefied gas, capping, and cooling, as well as other forces applied to it during the construction, transportation, and storage of the container 10. Additionally, the foregoing combination of features tends to resist overall deformation of the base portion 14 of the container 10.

Figure 6:
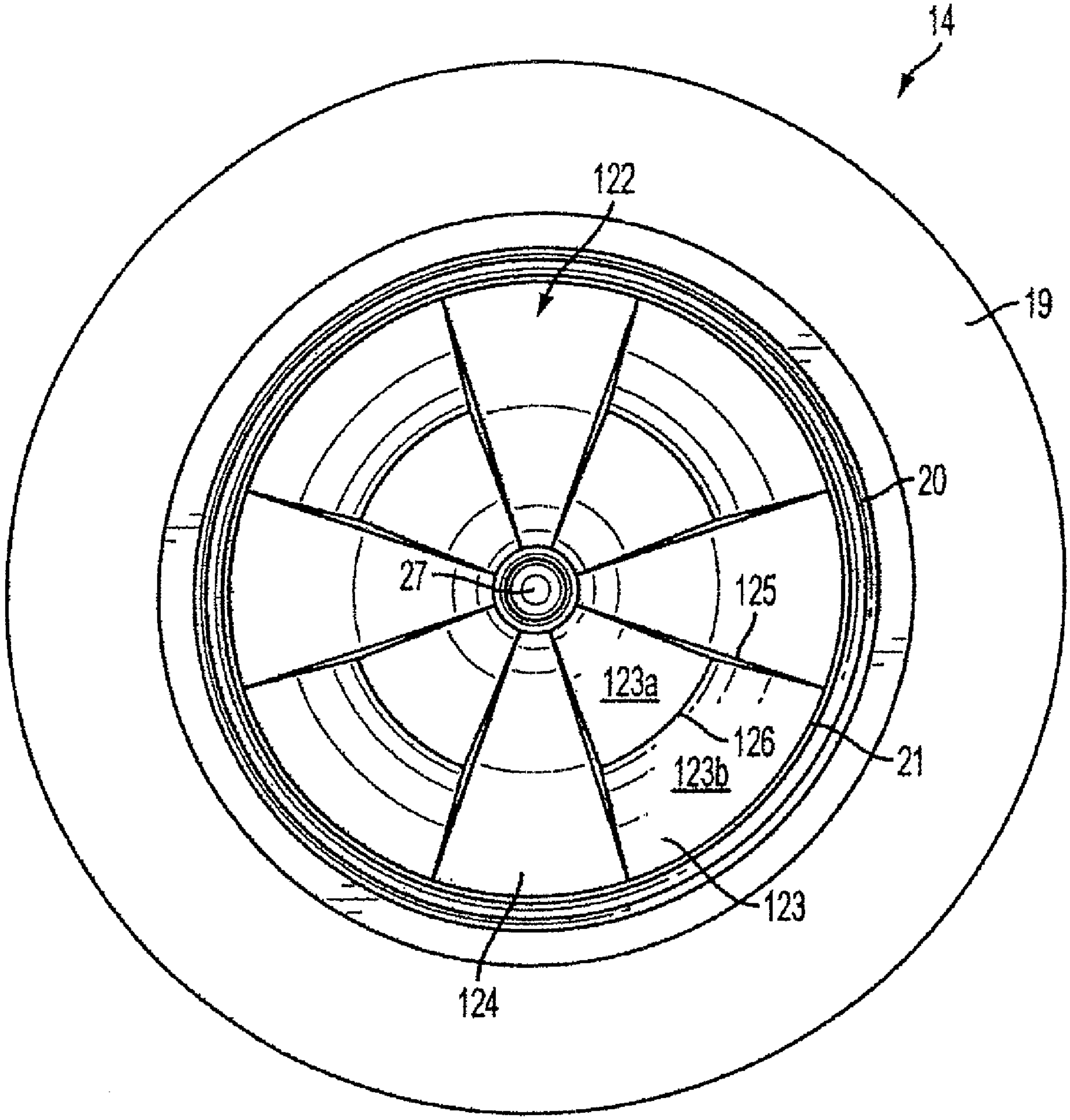
FIG. 6 is a bottom view of the base portion of the plastic container according to another exemplary embodiment of the present invention.
Figure 7:
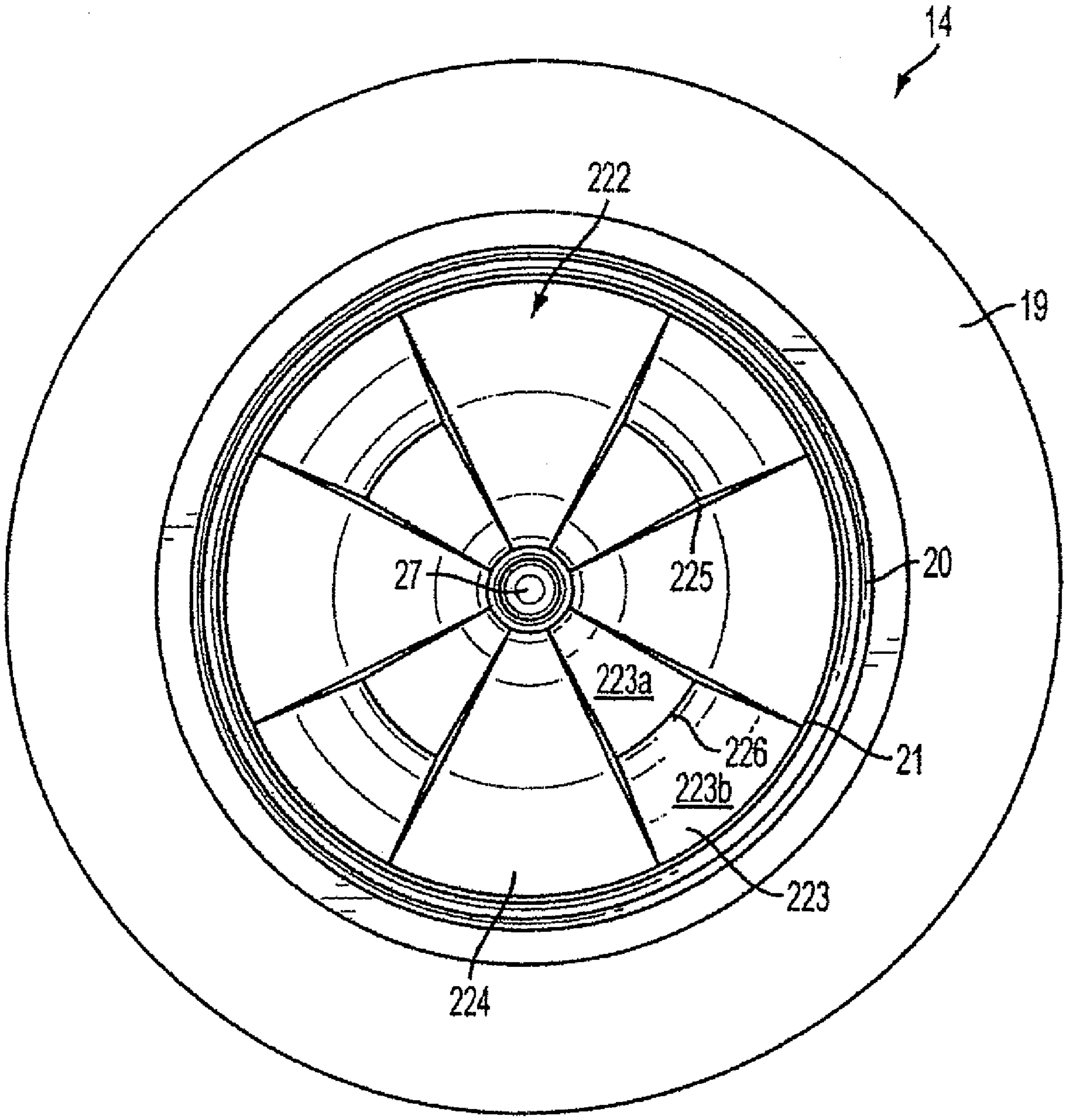
FIG. 7 is a bottom view of the base portion of the plastic container according to yet another exemplary embodiment of the present invention.

FIGS. 6 and 7 are bottom views of further exemplary embodiments of the base portion 14 of the present container 10. The base portion 14 depicted in FIG. 6, for example, is substantially the same as that depicted in FIG. 2, except that the first plurality of substantially triangular panels 123 occupy a larger area of the concave dome portion 122 than the second plurality of substantially triangular panels 124. Alternatively, the base portion 14 depicted in FIG. 7, for example, is substantially the same as that depicted in FIG. 2, except that the first plurality of substantially triangular panels 223 occupy a smaller area of concave domed portion 222, than the second plurality of substantially triangular panels 224.

The container 10 can be made by conventional blow molding processes including, for example, extrusion blow molding, stretch blow molding, and injection blow molding. The container 10 has a one-piece construction and can be prepared from a monolayer plastic material, such as a polyamide, for example, nylon; a polyolefin such as polyethylene, for example, low density polyethylene (LDPE) or high density polyethylene (HDPE), or polypropylene; a polyester, for example polyethylene terephthalate (PET), polyethylene naphtalate (PEN); or others, which can also include additives to vary the physical or chemical properties of the material. For example, some plastic resins can be modified to improve the oxygen permeability. Alternatively, the container 10 can be prepared from a multilayer plastic material. The layers can be any plastic material, including virgin, recycled, and reground material, and can include plastics or other materials with additives to improve physical properties of the container. In addition to the above-mentioned materials, other materials often used in multilayer plastic containers include, for example, ethylvinyl alcohol (EVOH) and tie layers or binders to hold together materials that are subject to delamination when used in adjacent layers. A coating may be applied over the monolayer or multilayer material, for example to introduce oxygen barrier properties. In an exemplary embodiment, the present container is prepared from PET.

Figure 8:
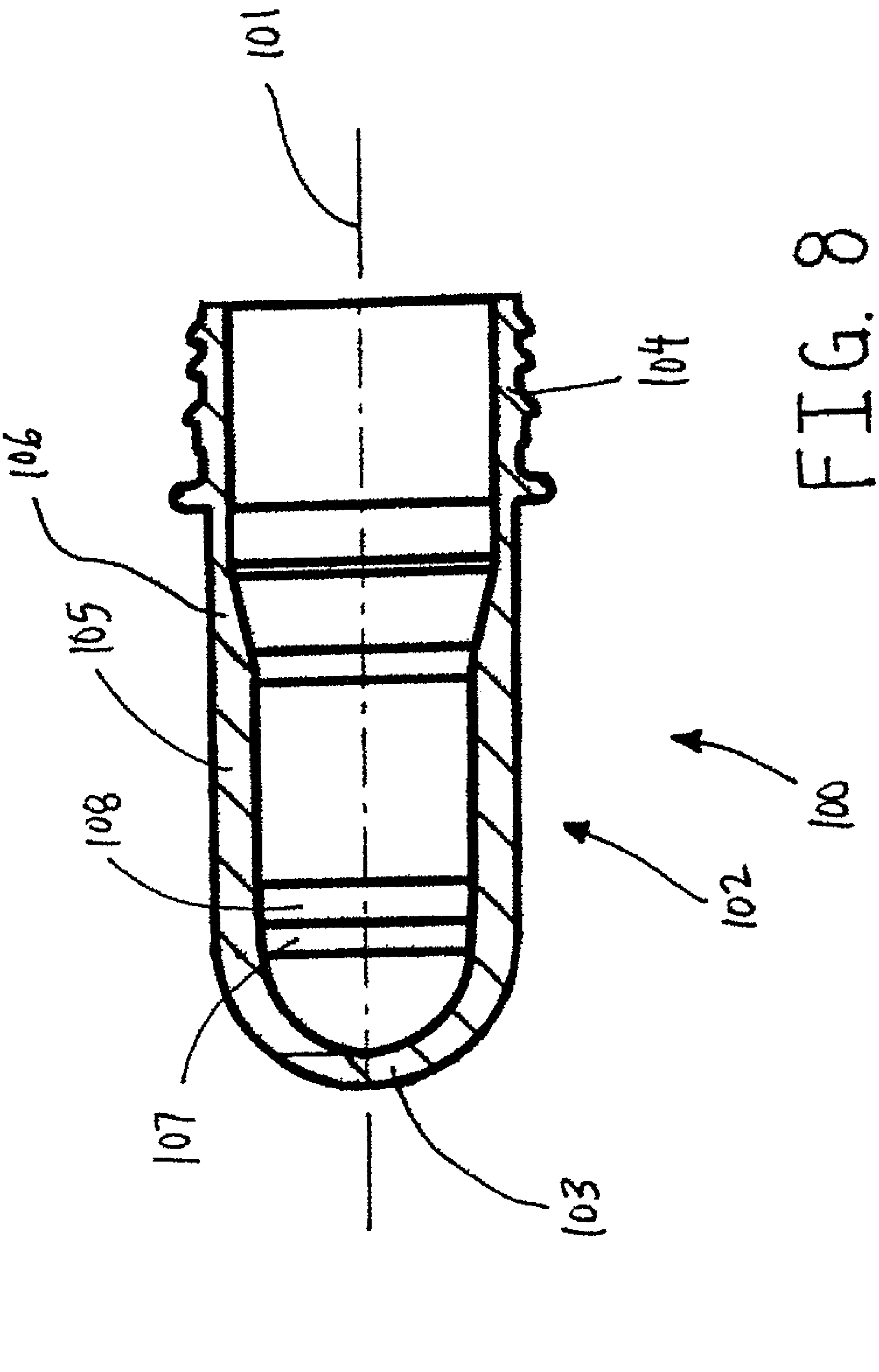
FIG. 8 depicts a cross-sectional view of a preform for forming into the plastic container of the present invention.

FIG. 8 depicts a cross-sectional view of a preform 100 configured for forming the container 10 of the present invention. The preform 100 can be formed into container 10 according to the foregoing blow molding processes, for example. The preform 100 defines a longitudinal axis 101 and includes body portion 102 extending longitudinally between a closed end portion 103 and an open end portion 104. The open end portion 104 can be a neck portion, such as, for example, the neck portion 12 described with reference to FIG. 1. The preform body portion 102 can include a predetermined material thickness in a middle section 105 and can further include a tapered section 106 adjacent to the open end portion 104 in which the material thickness gradually decreases between the middle section 105 and the open end portion 104. In the exemplary embodiment shown in FIG. 8, the closed end portion 103 has a predetermined thickness near the longitudinal axis that is less than the predetermined thickness of the middle section 105 of the body portion 102. The thickness of the closed end portion 103 gradually increases to portions 107 and 108 as the closed end portion 103 extends outwardly and longitudinally toward the middle section 105 of the body portion 102 to provide sufficient material for annular standing ring portion 20 and substantially cylindrical reinforcing ring portion 21 when the preform 100 is blown into container 10.

Figure 9:
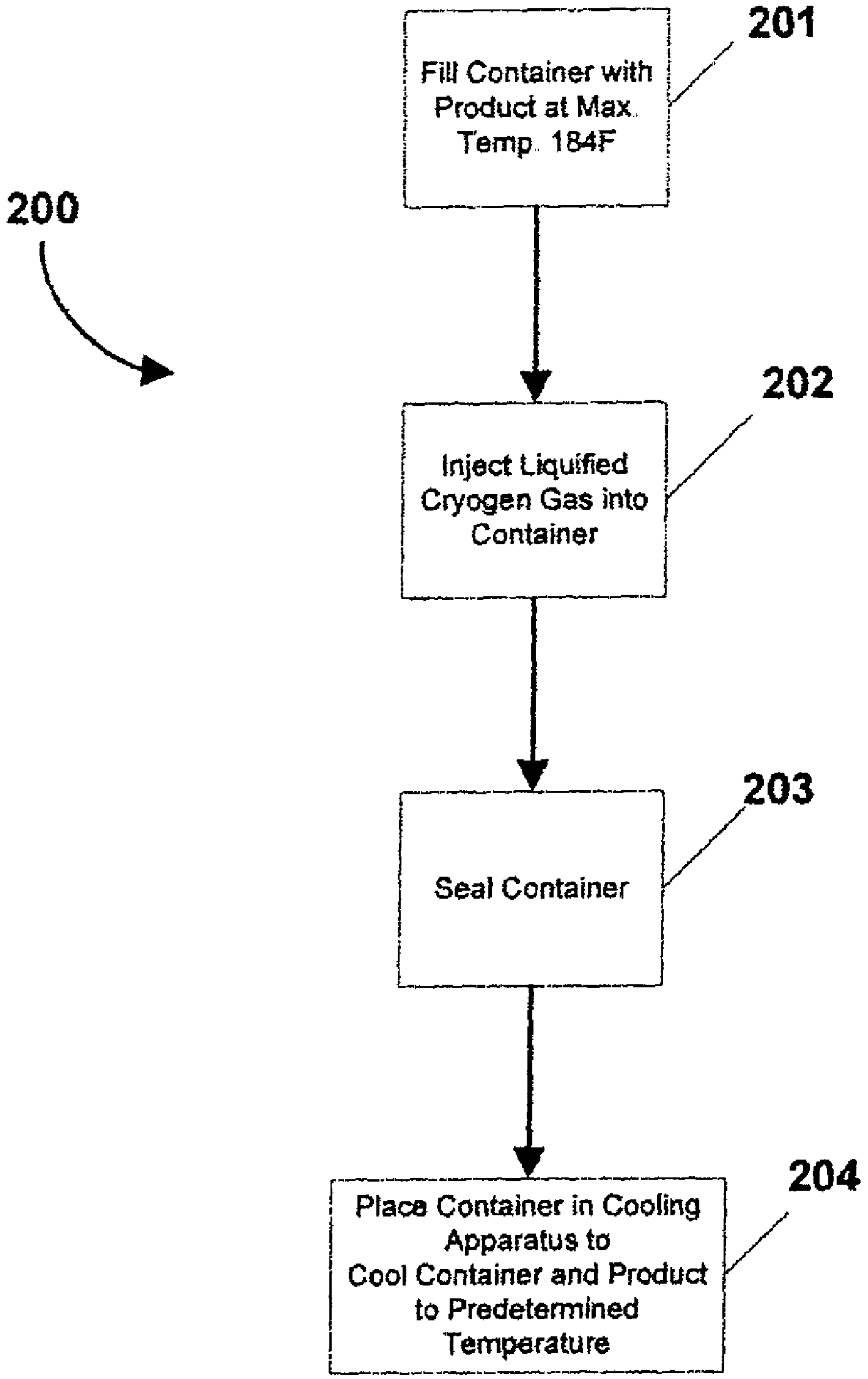
FIG. 9 is a flowchart depicting a method of hot filling a plastic container with a product according to an exemplary embodiment of the present invention.

A method 200 of hot filling a plastic container with a product is also provided (FIG. 9). In step 201, the plastic container is hot filled to a predetermined fill point with a product at a maximum temperature of approximately 184° F., for example. In an exemplary embodiment, the container is hot filled at a temperature of between 178° F. and 180° F. to a fill point at the support flange of the container. Non-limiting examples of the product may be any liquid product that can be hot filled such as, for example, apple juice or orange juice. In step 202, the container is then injected with liquefied gas, such as, for example, liquid nitrogen, and capped shortly thereafter to seal the product in the container and to create a positive internal pressure (step 203). The liquefied gas can be injected by an apparatus such as that disclosed in U.S. Patent Application Publication No. 2005/0011580 A1 to Ziegler et al., which is incorporated herein by reference in its entirety. The method further includes the step 204 of placing the container in a cooling apparatus after capping. In one exemplary embodiment, placement of the container in the cooling apparatus can take place in less than approximately 90 seconds (for example, approximately 45 seconds) from the time the container is sealed. The container and product are cooled to a predetermined temperature, such as, for example, approximately room temperature or 80° F. The foregoing method has several advantages including longer product shelf life as a result of limiting the amount of oxygen in the capped and sealed container.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A method of hot filling a plastic container, comprising:

filling the plastic container to a predetermined fill point with a product, the product having a maximum temperature of approximately 184 degrees F.;

injecting a liquid cryogen material into the filled plastic container;

sealing the plastic container with a closure to create a positive internal pressure;

placing the plastic container and the product in a cooling apparatus in less than approximately 90 seconds from sealing to cool the container and the product to a predetermined temperature;

wherein the plastic container further comprises means for accommodating the positive internal pressure; and wherein the means for accommodating the positive internal pressure comprises a base portion having a substantially cylindrical ring portion and a concave domed portion having first and second pluralities of circumferentially spaced substantially triangular panels.

2. The method of claim 1, wherein the plastic container and the product are placed in the cooling apparatus in approximately 45 seconds from sealing.

3. The method of claim 1, wherein in the filling step, the product has a temperature of between approximately 178 degrees F. and 180 degrees F.

* * * * *